(12) United States Patent
Bloy et al.

(10) Patent No.: US 8,421,631 B2
(45) Date of Patent: Apr. 16, 2013

(54) RADIO FREQUENCY SIGNAL ACQUISITION AND SOURCE LOCATION SYSTEM

(75) Inventors: Graham P. Bloy, St. Louis, MO (US); Matthew E. Pierce, Troy, IL (US); Russell Hofer, St. Louis, MO (US)

(73) Assignee: RF Controls, LLC, St. Louis, MO (US)

( * ) Notice: Subject to any disclaimer, the term of this patent is extended or adjusted under 35 U.S.C. 154(b) by 1290 days.

(21) Appl. No.: 12/159,468

(22) PCT Filed: Mar. 31, 2008

(86) PCT No.: PCT/US2008/058824
§ 371 (c)(1),
(2), (4) Date: Jun. 27, 2008

(87) PCT Pub. No.: WO2009/035723
PCT Pub. Date: Mar. 19, 2009

(65) Prior Publication Data
US 2010/0225480 A1 Sep. 9, 2010

Related U.S. Application Data

(60) Provisional application No. 60/993,418, filed on Sep. 11, 2007.

(51) Int. Cl.
*G08B 13/14* (2006.01)
(52) U.S. Cl.
USPC .......... 340/572.4; 340/572.7; 340/572.1; 340/10.1; 455/456.2; 455/456.1; 455/562.1; 342/42; 342/44; 342/147
(58) Field of Classification Search .......... 340/572.1, 340/572.7, 572.4, 10.1; 455/456.2, 456.1, 455/562.1; 342/42, 44, 147; 343/700, 860
See application file for complete search history.

(56) References Cited

U.S. PATENT DOCUMENTS

| | | | | |
|---|---|---|---|---|
| 4,642,649 A | * | 2/1987 | Lightfoot | 342/458 |
| 4,728,955 A | * | 3/1988 | Hane | 342/140 |
| 4,752,969 A | * | 6/1988 | Rilling | 455/278.1 |
| 5,686,928 A | | 11/1997 | Pritchett et al. | |
| 5,708,441 A | * | 1/1998 | Kanai | 342/359 |
| 6,282,427 B1 | * | 8/2001 | Larsson et al. | 455/456.2 |
| 6,480,108 B2 | | 11/2002 | McDonald | |
| 6,753,782 B2 | | 6/2004 | Power | |
| 6,989,741 B2 | | 1/2006 | Kenny et al. | |

(Continued)

OTHER PUBLICATIONS

International Search Report for PCT Application No. PCT/IB/53643; ISA/US, mailed Mar. 30, 2009.

(Continued)

*Primary Examiner* — Tai T Nguyen
*Assistant Examiner* — Hongmin Fan
(74) *Attorney, Agent, or Firm* — Babcock IP, PLLC

(57) ABSTRACT

A radio frequency signal acquisition and source location system, including a first signal acquisition and source location module comprising an RF transceiver coupled to an antenna, the antenna provided with a electronic steering circuit. The antenna operative to launch an interrogation signal, the interrogation signal steerable by an electronic steering circuit. A processor operatively coupled to the RF transceiver and the electronic steering circuit, the processor provided with a data storage for storing a signal data record for each of at least one response signal(s) received by the RF transceiver(s). The signal data record including a signal identification, a received signal strength indicator and an RF signal direction along which respective signal(s) are received by the antenna, the RF signal direction derived from the electronic steering circuit. A position logic operative upon the data record(s) deriving a three dimensional signal origin location of each response signal.

15 Claims, 6 Drawing Sheets

U.S. PATENT DOCUMENTS

| | | | |
|---|---|---|---|
| 7,002,461 B2 | 2/2006 | Duncan et al. | |
| 7,030,761 B2 | 4/2006 | Bridgelall et al. | |
| 7,061,366 B2 | 6/2006 | Bell et al. | |
| 7,098,794 B2 | 8/2006 | Lindsay et al. | |
| 7,119,687 B2 | 10/2006 | Paulsen et al. | |
| 7,119,738 B2 | 10/2006 | Bridgelall et al. | |
| 7,138,914 B2 | 11/2006 | Culpepper et al. | |
| 7,151,454 B2 | 12/2006 | Washington | |
| 7,154,395 B2 | 12/2006 | Raskar et al. | |
| 7,170,412 B2 | 1/2007 | Knox et al. | |
| 7,183,922 B2 | 2/2007 | Mendolia et al. | |
| 7,183,933 B2 | 2/2007 | Dzurko et al. | |
| 7,187,288 B2 | 3/2007 | Mendolia et al. | |
| 7,199,712 B2 | 4/2007 | Tafas et al. | |
| 7,199,719 B2 | 4/2007 | Steinberg | |
| 7,221,269 B2 | 5/2007 | Onderko et al. | |
| 7,257,418 B1* | 8/2007 | Chang et al. | 455/458 |
| 7,355,924 B2* | 4/2008 | Zimmerman et al. | 367/88 |
| 7,456,726 B2* | 11/2008 | Hansen et al. | 340/10.2 |
| 7,667,646 B2* | 2/2010 | Kalliola et al. | 342/417 |
| 8,002,645 B2* | 8/2011 | Savarese et al. | 473/353 |
| 2002/0021246 A1* | 2/2002 | Martek et al. | 342/373 |
| 2003/0017853 A1* | 1/2003 | Kanamaluru et al. | 455/562 |
| 2004/0102869 A1 | 5/2004 | Andersen et al. | |
| 2004/0102870 A1 | 5/2004 | Andersen et al. | |
| 2004/0198381 A1* | 10/2004 | Siegel et al. | 455/456.1 |
| 2004/0233461 A1 | 11/2004 | Armstrong et al. | |
| 2005/0110674 A1* | 5/2005 | Mendolia et al. | 342/81 |
| 2005/0258956 A1 | 11/2005 | Neuwirth | |
| 2005/0280504 A1 | 12/2005 | Pettus | |
| 2006/0001585 A1* | 1/2006 | Saito et al. | 343/754 |
| 2006/0019679 A1 | 1/2006 | Rappaport et al. | |
| 2006/0022800 A1 | 2/2006 | Krishna et al. | |
| 2006/0187043 A1 | 8/2006 | Allen | |
| 2006/0267731 A1 | 11/2006 | Chen | |
| 2007/0013516 A1 | 1/2007 | Freitag et al. | |
| 2007/0013521 A1 | 1/2007 | Lindsay et al. | |
| 2007/0018820 A1 | 1/2007 | Chand et al. | |
| 2007/0075864 A1 | 4/2007 | Culpepper et al. | |
| 2007/0096909 A1 | 5/2007 | Lally | |
| 2007/0097211 A1 | 5/2007 | Washington | |
| 2007/0103303 A1 | 5/2007 | Shoarinejad | |
| 2007/0103313 A1 | 5/2007 | Washington | |
| 2007/0120671 A1 | 5/2007 | Carmichael et al. | |
| 2007/0120736 A1 | 5/2007 | MacKenzie et al. | |
| 2007/0126583 A1* | 6/2007 | Maniwa et al. | 340/572.2 |
| 2007/0141997 A1 | 6/2007 | Wulff et al. | |
| 2007/0152829 A1 | 7/2007 | Lindsay et al. | |
| 2008/0030422 A1* | 2/2008 | Gevargiz et al. | 343/860 |
| 2008/0218404 A1* | 9/2008 | Ma et al. | 342/126 |
| 2008/0266171 A1* | 10/2008 | Weber et al. | 342/123 |

OTHER PUBLICATIONS

Gonzalez Moreno, J: Extended European Search Report for EP application No. 08789680.9, European Patent Office, Apr. 12, 2011 (transmitted Apr. 19, 2011), Munich DE.

* cited by examiner

RADIO FREQUENCY SIGNAL ACQUISITION AND SOURCE LOCATION SYSTEM

CROSS REFERENCE TO RELATED APPLICATIONS

This application claims the benefit of U.S. Provisional Patent Application No. 60/993,418, titled "Steerable Phase Array Antenna RFID Tag Locator and Tracking System", filed by Graham P. Bloy on Sep. 11, 2007 and hereby incorporated by reference in its entirety.

BACKGROUND

1. Field of the Invention

The invention generally relates to Radio Frequency (RF) signal acquisition and source location. More particularly, the invention relates to RF signal acquisition and source location in three dimensions.

2. Description of Related Art

Prior signal acquisition and source location systems, for example radio direction finding systems typically operate on a triangulation basis, where location accuracy is dependent upon the number of signal reception points and their relative distance away from each other and the signal source. Signal interference and false reflected or ghost signals frustrate the use of radio finding systems in smaller target areas. Radio direction finding systems may also apply flight timing as a component of a signal source location system. However, especially when applied to relatively short distances, the accurate measurement of the associated flight times with the required resolution may be cost prohibitive.

Radio Frequency Identification (RFID) technology is used, in multiple applications, to identify, track and trace physical objects. RFID tags also known as transponders or smart labels may be attached to objects, vehicles or people as a form of electronic label. These tags may contain unique identifiers (serial numbers) or may have a common identifier to identify a class of object such as a particular variety of a commodity.

RFID tags may be read by readers (also known as interrogators) in order to collect the identity of the RFID tags and therefore by association the identity of the item to which the tag is attached. RFID readers may be portable, for close proximity reading of known position RFID tags and/or configured as portals or gateways scanning for the passage of RFID tags passing through, such as a pallet load of materials individually marked with RFID tags entering or leaving a warehouse for inventory feedback and control, providing an entry, presence and or exit signal tracking. This does not provide a specific location and/or direction of travel, other than by transient association between the tags or tagged items and the location of the reader at the time of interrogation.

Multiple gateways and or portals may be applied to improve the general location resolution, but the number of gateways and or portals required to obtain a worthwhile location accuracy renders a high resolution solution using large numbers of gateway installations cost prohibitive. Also, neighboring gateways create significant interrogation signal interference issues.

A drawback of presence/passage gateways is that the residence time of the RFID tag(s) within the detection field may be relatively short and at the same time as large numbers of other RFID tags, such as where a pallet stacked with RFID tagged items moves past the gateway, during this short residence period it may be difficult to accurately interrogate and then differentiate between each of the resulting response signals and the full data content they each may transmit.

Another signal generating electronic tag responsive to RF interrogation is an electronic article surveillance (EAS) tag. An EAS tag system indicates presence of an EAS tag within an interrogation field, but an EAS tag carries no data to identify the item to which it is attached. Widely used as theft protection systems, EAS tags have the drawback of alarming only as the EAS tag passes through a gateway, typically located at the door of a store. In many jurisdictions, the law does not permit challenging a person once beyond the store property, which frustrates shop-lifting enforcement/property recovery.

Therefore, it is an object of the invention to provide a system and method(s) that overcomes deficiencies in the prior art.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

The inventors have analyzed presently available signal acquisition and source location technology and recognized that a cost effective solution was not available for three dimensional signal location within a defined zone. For example with respect to RFID signals, the inventors recognized that there was a collective mindset in the signal acquisition and source location technology space that RFID technology in particular is applicable only with respect to gateway type exit/entry and or general presence detection and reporting function(s).

Further, the inventors have recognized that multiple gateway solutions for determining a general signal direction and or speed determination are unnecessarily complex, impractical and cost prohibitive.

Therefore, the inventors have developed an RF signal intelligent tracking and control system (ITCS) 5 that utilizes one or more signal acquisition and source location (SASL) module(s) 10.

Figure 1:
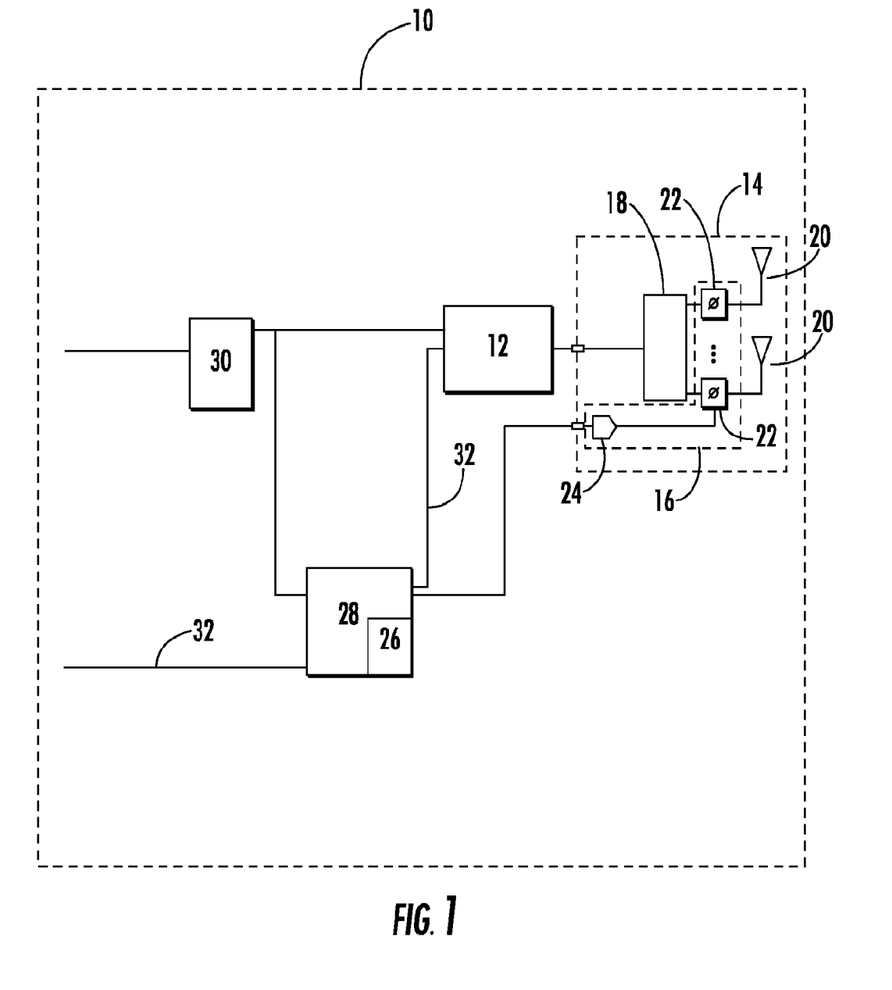
FIG. 1 is a schematic block diagram of an exemplary embodiment of a signal acquisition and source location module.

As shown in FIG. 1, an exemplary SASL module 10 includes an RF transceiver 12 operative to transmit an interrogation signal beam on a desired frequency or frequency band and to receive one or more response signals on a desired frequency or frequency band. The interrogation signal and response signal frequency(s) and or frequency band(s) may be configured to a common frequency or frequency band according to the signal parameters the system is configured for use with. For example, configured for use with ultra high frequency (UHF) RFID tag response signal(s), the RF transceiver 12 may operate in the 860-960 MHz frequency band. When optimized for RFID interrogation signal transmission and reception of backscatter modulation response signal(s) from one or more interrogation signal activated RFID tag(s), the RF transceiver 12 may also be known as an RFID reader. The RF transceiver 12 is coupled to an antenna 14 provided with an electronic steering circuit 16 for directing the interrogation signal beam into a desired direction.

As described herein below, it is highly advantageous for the antenna 14 to generate a narrow beam pattern. Although other types of narrow beam antenna 14 may be applied, an exemplary antenna type, is the phased array antenna 14. Phased array antennas 14, for example including a power splitter 18 dividing an interrogation signal from the RF transceiver 12 between an array of antenna element(s) 20 such as dipole, patch or other form of radiator antenna element(s) 20 may be formed as compact planar panels. To minimize interference and or for specific operating frequency requirements, the antenna 14 may be provided with a transmit antenna element 20 separate from a receive antenna element 20 and or respective arrays of transmit and receive antenna element(s) 20.

In addition to being configurable with a comparatively narrow beam characteristic, the phased array antenna 14 is also cost effectively directionally controllable by an electronic steering circuit 16 in the form of an array of phase shifter(s) 22, for example one phase shifter 22 for each antenna array element 20 or group of antenna element(s) 20.

Individual phase shifter 22 circuits, digitally controlled by a beam steering unit 24, may be formed for example as a series of varied reactances switchable in or out of line with the respective antenna element(s) 20 by varactors, the phase shifter(s) 22 operative to adjust the phase of the respective individual or group of antenna element(s) 20 coupled to the phase shifter 22. The beam steering unit 24 may include processor, memory and communications capabilities such as the ability to store a pre-programmed zone beam sweep pattern, such as a linear, orthogonal, spiral raster scan, specific direction, or locate by coordinates, including desired exclusion areas such as areas of known interference, signal reflection surfaces or other areas where passage of the interrogation signal beam is not desired. Further attributes include the ability to receive control instructions and transmit beam position data to a remote processor 28 or other controller. The phase shifter(s) 22 and beam steering unit 24 controlling them together comprise the electronic steering circuit 16, which may be integrated partially or fully with the antenna 14. A power supply 30 converts mains power for use by SASL module 10 electrical power consumers, including the RF transceiver 12 and controller 28. One skilled in the art will appreciate that, compared to mechanical and or electro-mechanical beam steering solutions, an electronic beam steering unit 24 provides significant improvements in sweep speed and has cost and reliability advantages.

The beam steering unit 24 is operative, by discrete control of the phase shifter(s) 22, to direct the antenna beam to a desired direction designated for example via theta and phi polar coordinates from a default beam direction normal to the antenna face. The beam driven by the electronic steering circuit 16 may preferably be directed from zero to 40 degrees from normal in any direction.

Calibration of the electronic steering circuit 16 may be performed by placing response signal(s) at the zone periphery, instructing the electronic steering circuit 16 to perform a sweep that includes the known response signals and then identifying same as the zone limits. Alternatively the electronic steering circuit 16 may be manually adjusted until the known response signals are recognized, then designating same as the zone limits between which to perform the zone sweep.

A processor 28, such as programmable personal, mini or hardwired computer, programmable controller, remotely or locally located, is operatively coupled to the RF transceiver 12 and the electronic steering circuit 16, for example by a direct digital data link 32 such as an Ethernet, FireWire, Universal Serial Bus, optical or other, for example parallel or serial wired or wireless data link. Alternatively, the RF transceiver 12 may be coupled to the electronic switching circuit 16 via a digital data link 32, and there through, along with the electronic switching circuit 16 to the processor 28 by another digital data link 32.

The processor 28 is preferably provided with a data storage 26, for example a hard drive, semi-conductor memory or network connected memory, for storing a signal data record for each of at least one response signal(s) received by the RF transceiver 12. The signal data record including at least a signal identification, a received signal strength indicator and an RF signal direction along which respective signal(s) are received by the antenna 14. The RF signal direction is derived from the electronic steering circuit 16 and a position logic operative upon the signal data record(s) is applied to derive a three dimensional signal origin location of each response signal.

The signal identification is a unique identifier data for differentiating a response signal from other response signals. Where the response signal is from an RFID tag, the signal identification can be the RFID tag identification or item identity.

The received signal strength indicator is a numeric value corresponding to a signal strength of the respective response signal received by the transceiver.

The RF signal direction is the direction along which the corresponding interrogation beam was launched, according to the electronic steering circuit 16 settings. The electronic steering circuit 16 may be calibrated, for example by scanning a zone for the direction that receives the strongest received signal strength indicator value from a response signal source at a known location with respect to the antenna 14.

Where the response signal magnitude is a function of how fully the signal position is illuminated by the interrogation beam, or where the antenna 14 has sufficiently high directional gain, the position logic may be configured to identify a primary signal data record; the primary signal data record being the signal data record in which the received signal strength indicator is the highest among signal data record(s) having a common signal identification. Because the back scatter modulation generated response signal strength indicator will be maximized when the responding RFID tag is fully illuminated by the interrogation beam, the RF signal direction associated with the primary signal data record represents a vector along which the response signal is positioned. Further, the received signal strength indicator associated with the primary signal data record is proportional to a distance along the RF signal direction from the antenna, enabling generation of a three dimensional signal origin location. Depending upon the precision desired, and or a degree of confidence in the apparatus and position logic, the three dimensional signal origin location may be a designated point in three dimensional space, or a defined area of three dimensional space at or in which the respective response signal originates. Where a defined area is used as the three dimensional signal origin location, a further logic step may be applied to determine the center of the defined area, for example from a calculation based upon the beam cross-section dimension, and designate same as the three dimensional signal origin location.

During the RF signal direction calibration procedures, the value of the received signal strength indicator from one or more response signals of known location may be used to similarly calibrate the return signal strength indicator proportionality factor and or function to apply to accurately convert the received signal strength indicator into a distance from the antenna to the response signal origin location along the RF signal direction specified beam.

The accuracy of a position logic result relying only upon the RF direction and the received signal strength indicator is related to the interrogation beam cross section dimensions at the response signal location, the number of different response signal samples obtained and the size of the beam sweep position increment or granularity performed between sampling of the response signal(s). Ideally, the beam cross section should be as narrow as possible and the beam sweep increment size as small as possible. However, considerations for beam strength at near and far zone locations from the antenna, as well as electronic steering circuit and or available processing time limitations may result in an interrogation beam cross section and beam sweep increment size large enough to introduce a significant position error, for example if multiple response signals fail to fall upon evenly distributed areas within the beam cross section.

Figure 2:
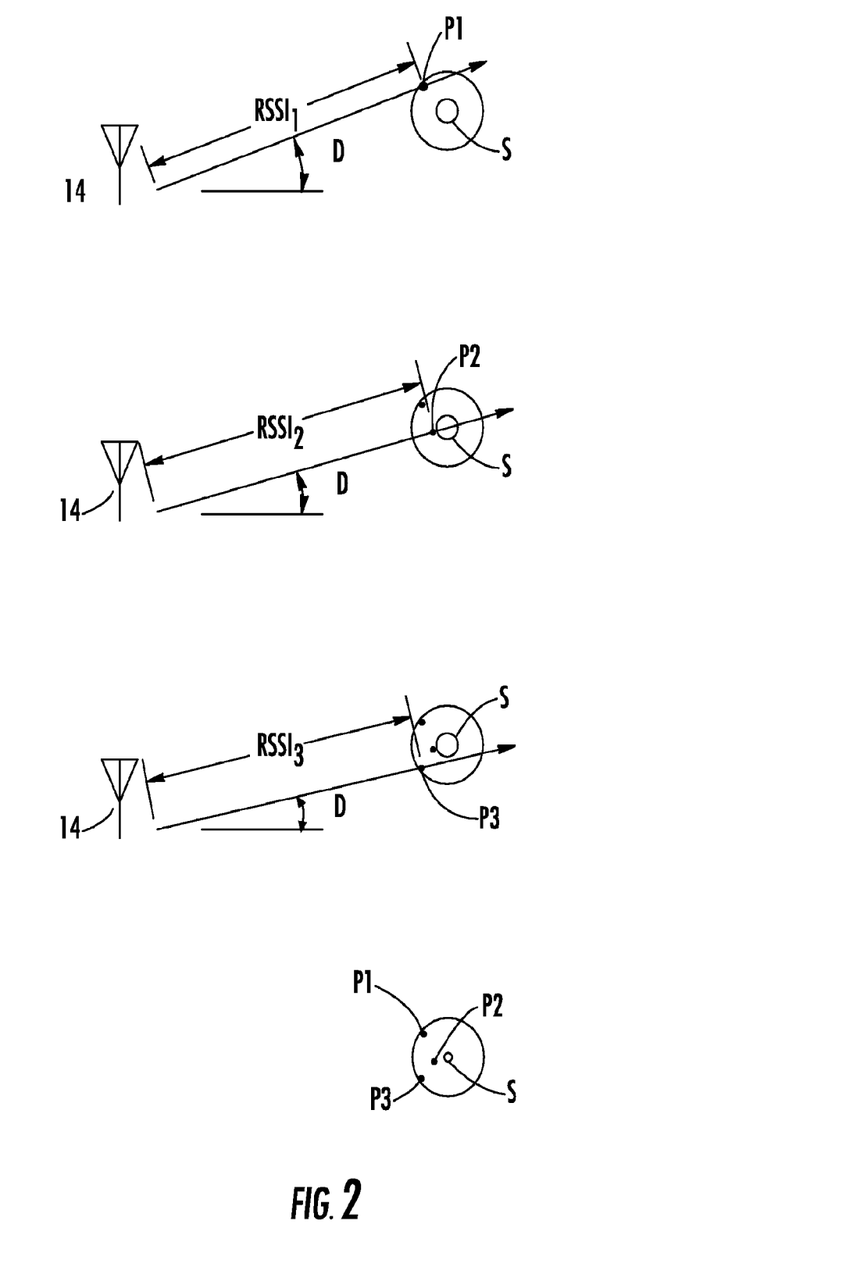
FIG. 2 is a schematic diagram demonstrating possible signal position results and a related curve fitting function.

As demonstrated in FIG. 2, where at least three response signal samples P1, P2, and P3 proximate to one another have the same signal identification, as the RF direction D is stepped around the same general area it can be assumed that the return signal strength indication(s) RSSI1, RSSI2 and RSSI3 associated with each of the three samples are proportional to a radar cross section of the actual signal source S, and that the resulting three dimensional signal origin locations associated therewith are each located on the face of the sphere closest to the antenna. Therefore, a position logic with enhanced accuracy can apply a curve fitting routine between the at least three points to define the sphere and there from a sphere center point. Testing by the inventors has shown that the position result accuracy is significantly improved by position logic that designates the calculated sphere center point as the three dimensional signal origin location.

Less calculation intensive and or faster to derive alternative methods for handling multiple signal samples with the same signal identification but varying position results from successive scans of a local area include applying an average to define the three dimensional signal origin location for the respective signal identification and or application of a weighted average, where the scan data record with the highest received signal strength indicator is given an increased weight during averaging with the other scanned position results for a common signal identification.

Metallic surfaces and the like within the zone may operate as reflectors of the various response signals, generating numerous ghost signals that can potentially result in erroneous three dimensional signal origin location designations. To improve signal discrimination, a discrimination logic may be applied by the processor to filter the signal data records between actual signal(s) and ghost signal(s).

Figure 3:
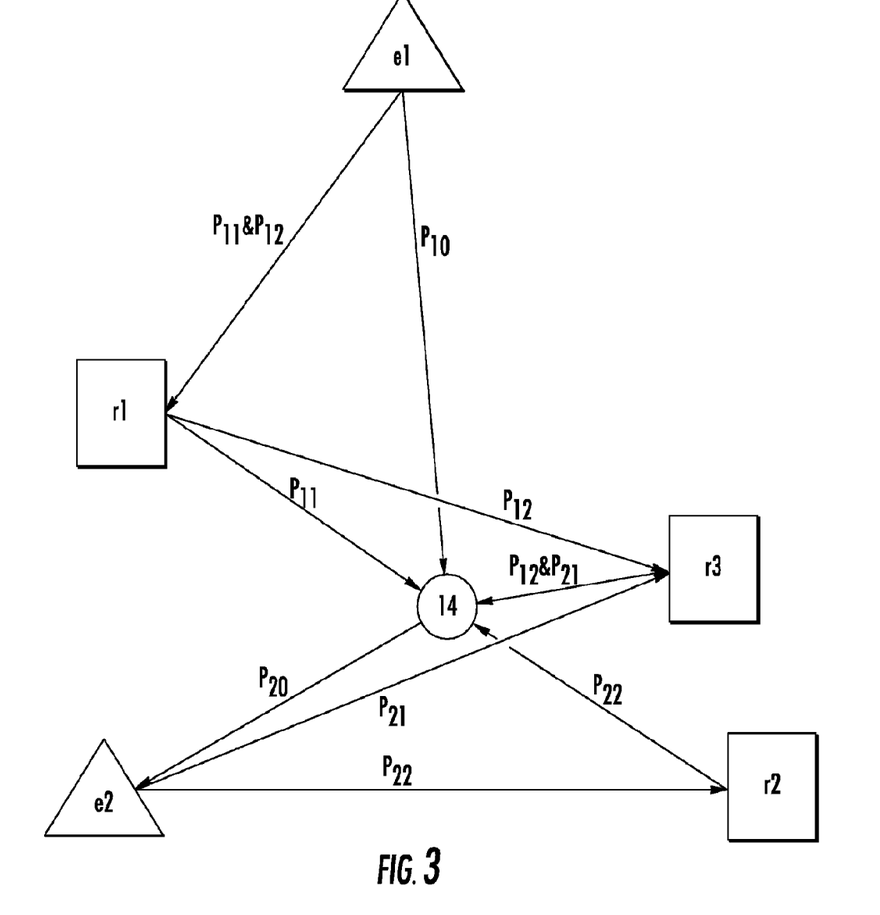
FIG. 3 is a schematic signal path diagram, demonstrating actual and ghost signals.

FIG. 3 demonstrates how two signal(s) e1 and e2 can each generate multiple ghost signals received by the antenna, some of these different signals, from the antenna 14 frame of reference, appearing to originate from a common location r3. Reflectors in the reception zone of the antenna generate ghost signal(s) along paths p11, p12, p21 and p22. Checking the signal identification of the received signals can differentiate between separate signal sources. Because a reflected signal path will always be longer than the single direct path (P10 or P20) between the respective signal source (E1 or E2) and the antenna 14, a check of the received signal strength indicator of the response signals with a common signal identification can be used to identify an actual signal from a plurality of ghost signals, the response signal having the highest response signal strength indicator being the actual signal. Signals identified as ghost signals may be discarded, leaving a single signal data record for each actual signal identification.

Figure 4:
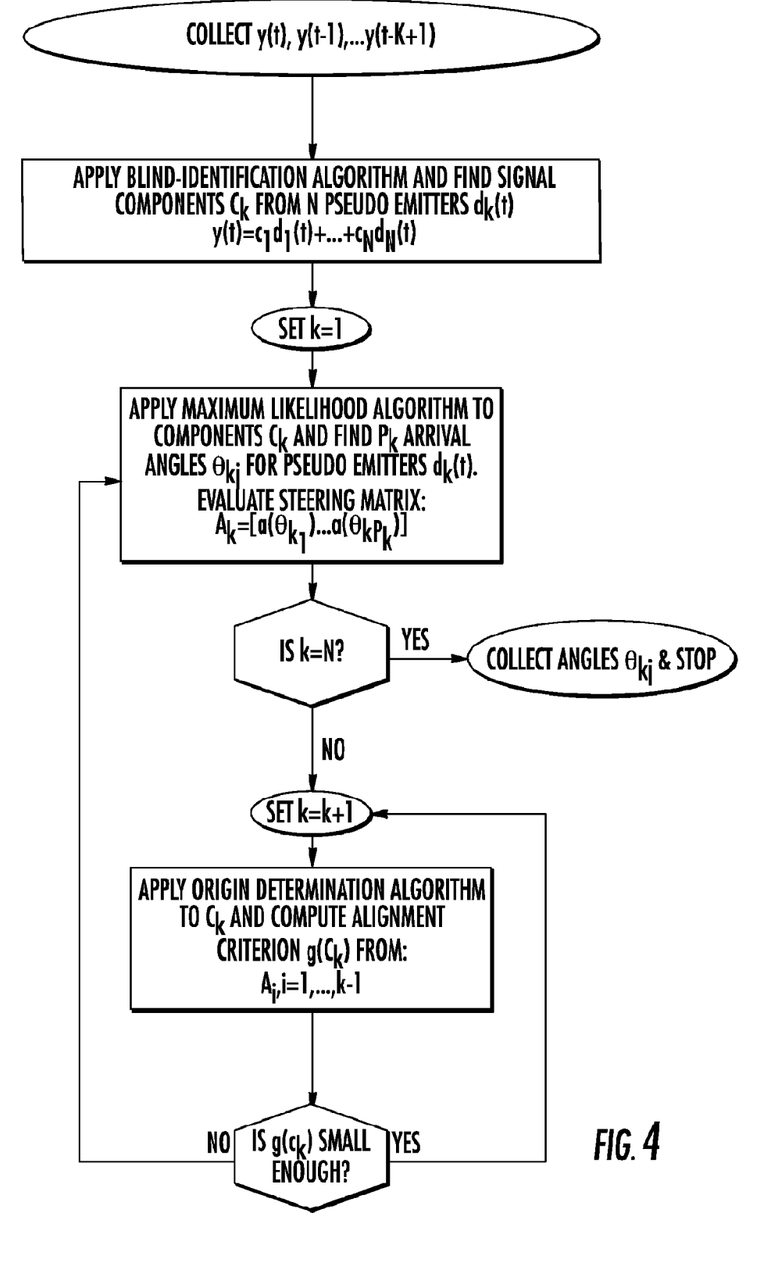
FIG. 4 is a flow chart diagram demonstrating a multi-path ambiguity resolution logic.

Alternatively, the discrimination logic may employ a multi-path ambiguity resolution logic (MPAL) as shown in FIG. 4 (the notations following a "^" representing superscript notations). The MPAL accesses a collection of received response signal(s) and converts each of them to a complex envelope, the collection represented as $y(t), y(t-1), y(t-K+1)$. A Blind-Identification Logic is then applied to identify signal components $c^k$ from N pseudo emitters $d^k(t)$: $y(t)=c^1 d^1(t)+ \ldots +c^N d^N(t)$. Then, for each of k=1 to k=N, a Maximum Likelihood Logic is applied to $c^k$ to find Pk arrival angles $(theta)^{kj}$ for pseudo emitter $d^k(t)$, which can then be applied to a steering matrix: $A^k=[a((theta)^{k1})) \ldots a((theta)^{kPk})]$. An origin determination logic upon $c^k$ then computes an alignment criterion $g(c^k)$ from $A^I$, $I=1, \ldots, k-1$, the origin determination logic continuing to increment k until $g(c^k)$ is larger than a predefined probability factor. When k=N, the angles $(theta)^{kj}$ are collected and the MPAL is completed.

To obtain higher resolution points proximate a likely response signal location, the beam sweep rate and or increment may be adjusted to increase the residence time at a particular RF signal direction of interest. For example, when a response signal is detected, the next scan increment may be reduced and the residence time increased. Similarly, where no response signal has been detected, the scan increment may be increased and the dwell time reduced until a further response signal is detected. Further, as multiple scans are completed, the approach towards areas of the previous scan that had response signal activity may initiate similar sweep increment reductions and scan dwell time increases to attempt to identify with greater resolution the specific bounds of the scan that indicate specific signal identification response signal activity. By focusing on identified areas of signal activity and less upon areas of no or rare activity, the overall scan rate may be maximized. To reduce the load these types of logic operations may apply to the local processor and data storage bandwidth they may be placed at the edge server or master SASL 10, if present.

The SASL 10 may be formed as an integral single assembly or arranged as separate sub-modules coupled by the respective digital data links. Where a single integral assembly is applied, installation requirements are significantly simplified.

Figure 5:
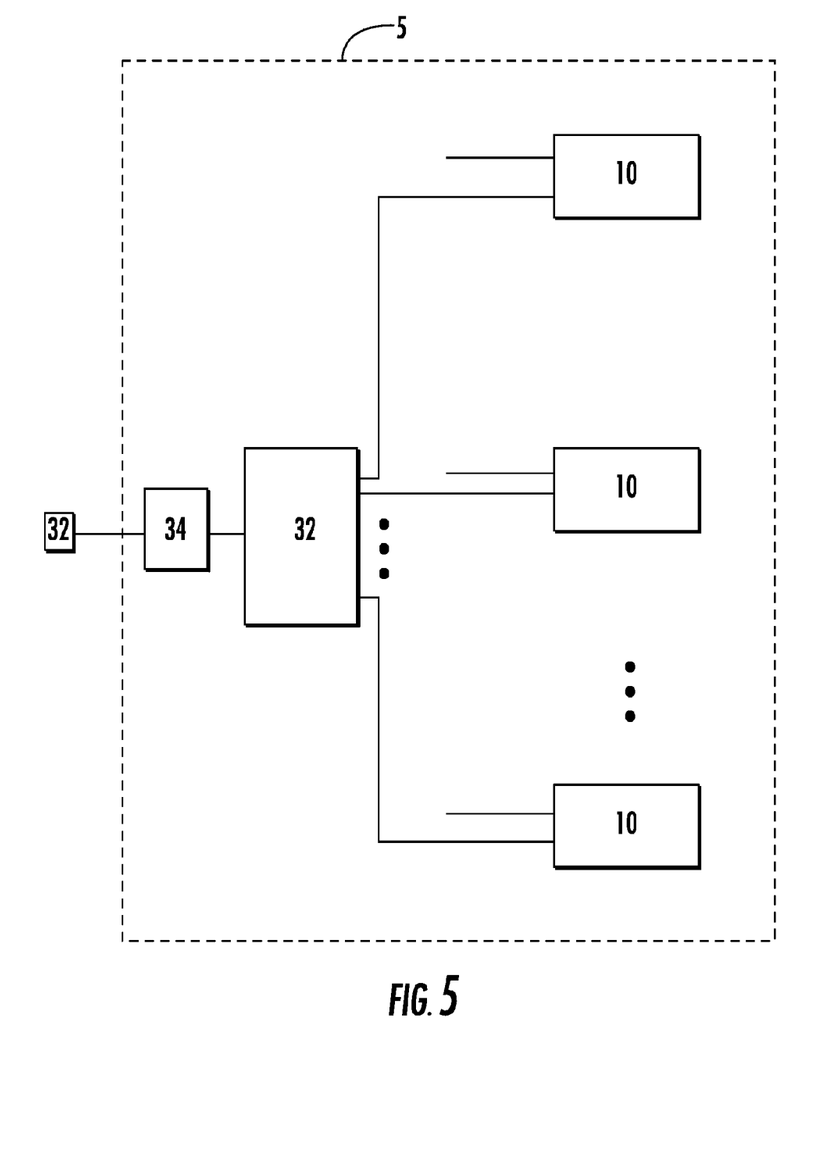
FIG. 5 is a block diagram of an RF signal intelligent tracking and control system embodiment with a plurality of signal acquisition and source location modules.

Although a single SASL 10 may be used to generate a three dimensional origin location of each response signal, the ITCS 5 system accuracy may be significantly improved, especially the distance from the respective antenna along the RF signal direction component based upon the received signal strength indicator, by applying a plurality of spatially separated SASL modules 10 each arranged facing the same zone and or zone portions of a larger area and communicating signal data over a digital data link to an edge server 34 or other processor resource. The edge server 34 is operable, for example, to perform a triangulation logic between the identified response signals to generate a higher order three dimensional signal origin location for each response signal. The edge server 34 may be separately located, for example as shown in FIG. 5, or integrated into one of the SASL module 10, to form a master SASL module 10. Mounting the SASL module(s) 10 above the zone, for example proximate to the ceiling of a warehouse, store or auditorium provides the SASL module10 isolation from accidental impact, vandalism and contaminants as well as providing a clear view of the desired zone below.

Operating on the signal data from each of the SASL module(s) 10 reporting to the edge server 34, the triangulation logic is configured to select response signal(s) from each of the SASL module(s) 10 having a common signal identification. The RF signal direction of each of the common signal identification signal data is then applied as an input to an intersection calculation to determine an intersection point of each antenna beam. The resulting intersection defined area can then be processed to arrive at a center point in three dimensional space, which is the higher order three dimensional origin location for the respective response signal.

Alternatively, the three dimensional signal origin location(s), for a common signal identification, reported by each SASL module 10 may be averaged to obtain the higher order three dimensional origin location.

Another effect of multiple SASL module(s) 10 directing their respective interrogation signal beam(s) through a common point of the zone is that the increased signal illumination of, for example, a passive RFID located at the interrogation signal beam(s) intersection point, will, where backscatter modulation is being utilized, increase the signal strength of the response signal activated, and thus the corresponding received signal strength indicator of same. The increase in the value of the return signal source indicator may be applied as a further higher order three dimensional signal origin refinement factor of the position and or triangulation logic.

To obtain higher resolution points proximate a likely response signal location, the beam sweep rate and or increment may be adjusted to increase the residence time at a particular RF signal direction of interest. For example, when a response signal is detected, the next scan increment may be reduced and the residence time increased. Similarly, where no response signal has been detected, the scan increment may be increased and the dwell time reduced until a further response signal is detected. Further, as multiple scans are completed, the approach towards areas of the previous scan that had response signal activity may initiate similar sweep increment reductions and scan dwell time increases to attempt to identify with greater resolution the specific bounds of the scan that indicate specific signal identification response signal activity. By focusing on identified areas of signal activity and less upon areas of no or rare activity, the overall scan rate may be maximized. To reduce the load these types of logic operations may apply to the local processor 28 and data storage 26 bandwidth they may be placed at the edge server 34 or master SASL module10, if present, and areas of the scan designated for higher or lower interest transmitted back to the respective electronic steering circuit.

The edge server 34 and or processor 28 of each SASL module10 may also perform comparisons of changes between the three dimensional signal origin location resulting from successive interrogation signal sweeps of the zone and apply same as inputs to a velocity and or direction logic, to determine a speed and direction indication for each response signal. The velocity logic comparing the position change to the time elapsed between same and the direction logic applying a vector beginning at the previous three dimensional position and ending at the present three dimensional position to generate a direction of travel.

The historic velocity and direction results may be used to direct the SASL module(s) 10 to anticipate future locations of a particular signal source and or steer the interrogation signal to remain upon a particular signal source of interest as it moves through the zone.

In various embodiments, the several logical parameters that the various processor(s) may perform may be stored in the data storage as software code that may alternatively be loaded into the processor, coded into a complex programmable logic device (CPLD), field programmable gate array (FPGA) or permanent or rewritable static memories such as erasable programmable read-only memory (EPROM).

The SASL module(s) 10 and or edge server 34 if present are coupled to an operator interface such as computer display and or a user accessible web page for control and feedback.

In an exemplary embodiment, for example a warehouse for products labeled with RFID tags, a SASL module10 is calibrated to designate a zone to be monitored and within the zone for distances from the antenna which correspond to measured response signal strength indicators, related to the type of RFID tag in use. Further, exclusions from a sweep pattern may be identified to the processor 28 and or electronic steering circuit 16, such as reflection sources such as metal pillars and the like or sources of interference such as motors and or unrelated radio frequency components residing within the zone.

Figure 6:
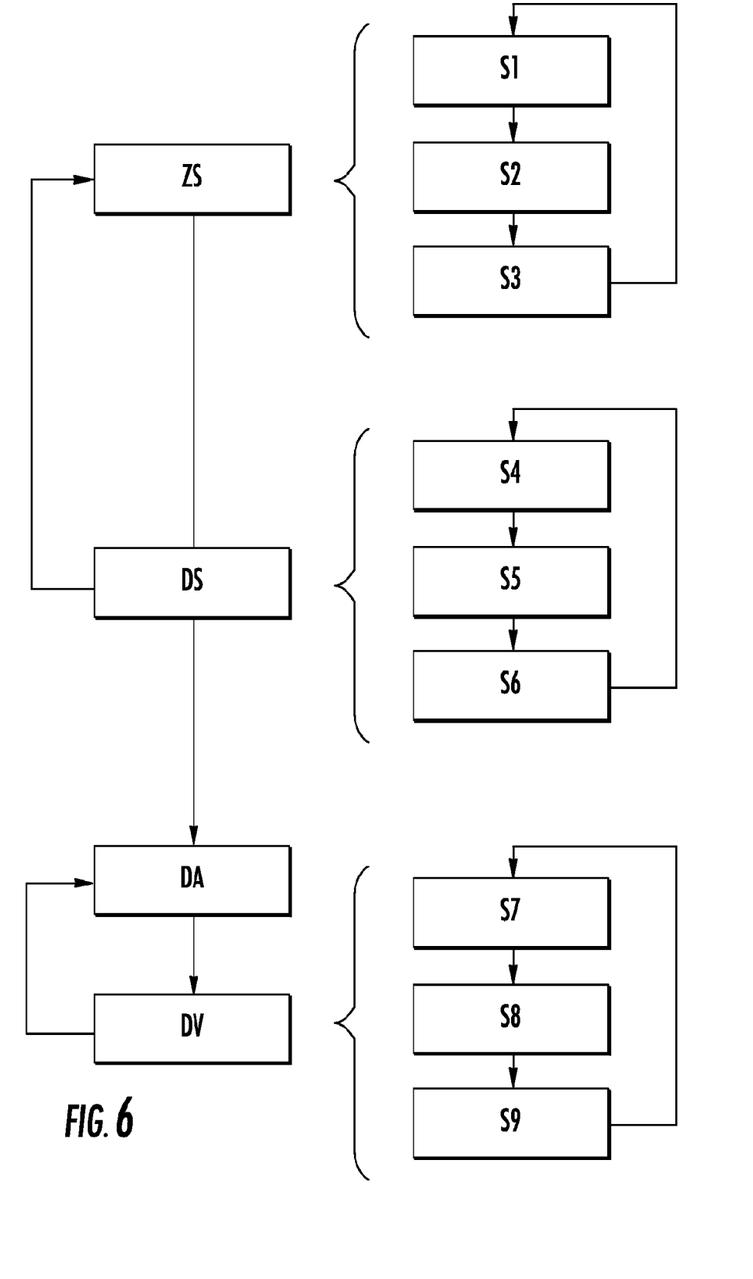
FIG. 6 is flow chart demonstrating an operations loop for an RF signal intelligent tracking and control system embodiment.

In use, the single or multiple SASL module(s) 10 each operate in a signal acquisition and source location loop, as generally shown in FIG. 6, wherein during a repeating zone scan, ZS, each new antenna orientation, S1, along the sweep pattern, an interrogation signal is launched and any corresponding response signals monitored, S2, and parameters stored, S3.

When a zone scan is completed, the resulting data is preprocessed, DS, and identification responses with a common signal identification are filtered, S4, and curve fitting or other data harmonization applied, S5, so that the data is reduced to a set of unique targets for each scan, S6. Where multiple response signals are present, the interrogation signal power level may be increased, and the residence time for the present antenna orientation increased. When signal acquisition is complete, the results are stored, in the data storage 26 and or transmitted to external processor(s) 28, an edge server 34 and or a master SASL module 10, if present, DA. As the data storage 26 is populated with response signal data results from multiple scans, post processing can begin, such as identifying all the responses with a common signal identification, optionally performing signal discrimination logic to eliminate ghost signals, for example by a probability weighting factor and or a multi-path ambiguity resolution logic. Refining position logic can be performed, including curve fitting, averaging or the like to refine the response signal position for continuing processing as further scans are completed.

Further methods for validating and or optimizing the three dimensional signal origin locations include timing of a delay between the interrogation signal initiation and a corresponding reception of a signal and or modulating the interrogation signal strength to identify a cut-off signal strength below which the signal is not responsive to the interrogation signal, the cut-off signal strength proportional to a distance between the antenna and the three dimensional signal origin location.

If multiple SASL modules are present, the data storage contents and or three dimensional signal origin data at the edge server and or a master SASL is processed for higher level higher order three dimensional signal origin locations, DV. Further, as the data from multiple scans is received, comparisons between the different scan results for a single signal identification may be performed, S7, to determine velocity, S8, and direction, S9, of individual response signals, and thereby the related RFID tags.

Although the invention has been explained with the assistance of specific reference to RFID backscatter modulation and RFID tag technologies, one skilled in the art will recognize that the invention is similarly usable with any form of radio signal system where a response signal may be generated by an interrogation signal. For example, Wi-Fi, WiMAX and cellular radio communications systems may be configured according to the invention by configuring the remote devices to respond with a response signal broadcast when they receive a specific interrogation signal and or interrogation signal data content.

One skilled in the art will recognize that the present pioneering inventions enable three dimensional location of response signals utilizing highly reliable, cost efficient, static solid state equipment. The invention provides direction and velocity tracking, useful for example to identify movement of targets into areas where additional actions may be desired, such as user access, process control, inventory control and or theft prevention. Applied to RFID technology, the present invention enables new applications of RFID technology that the prior gateway based general presence indication systems could not begin to suggest.

Table of Parts

| | |
|---|---|
| 5 | intelligent tracking and control system |
| 10 | signal acquisition and source location module |
| 12 | RF transceiver |
| 14 | antenna |
| 16 | electronic steering circuit |
| 18 | power splitter |
| 20 | antenna element |
| 22 | phase shifter |
| 24 | beam steering unit |
| 26 | data storage |
| 28 | processor |
| 30 | power supply |
| 32 | digital data link |
| 34 | edge server |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. A method for radio frequency signal acquisition and source location, comprising steps of:
   steering, via an electronic steering circuit, an interrogation signal through a sweep pattern of a zone;
   recording a data record of each of a signal identification, a received signal strength indicator and an RF signal direction along which respective response signal(s) are received, the RF signal direction derived from the electronic steering circuit;
   performing a discrimination logic operation upon the data record(s) to filter the data record(s) between an actual signal(s) and a ghost signal(s);
   applying of a probability weighting factor to the actual signal(s) and the ghost signal(s) during the discrimination logic operation, then filtering for the actual signal(s) according to a value of the probability weighting factor; and
   performing a position logic operation with the RF signal direction and the received signal strength indicator as inputs to derive a first three dimensional signal origin location within the zone of each of the response signal(s).

2. The method of claim 1, wherein the interrogation signal is operative to enable or energize a RFID tag for backscatter modulation transmission of the response signal, the response signal including at least a tag identification or item identity of the RFID tag.

3. The method of claim 1, wherein the position logic operation identifies the data record(s) wherein the signal identification is the same;
   maps the respective response signal(s) within the zone; and
   applies a curve fitting analysis to generate a predicted response signal location where the signal strength indicator is maximized, designating the predicted response signal location as the first three dimensional signal origin location for the response signal.

4. The method of claim 1, wherein the position logic operation identifies the data record(s) wherein the signal identification is the same;
   maps the respective response signal(s) within the zone; and
   designates a middle location between the respective signals as the first three dimensional signal origin location for the response signal.

5. The method of claim 1, wherein the position logic operation identifies the data record(s) wherein the signal identification is the same;
   maps the respective response signal(s) within the zone; and
   designates a middle location between the respective signals, weighted by the location of the data record with the highest signal strength indicator, as the first three dimensional signal origin location for the response signal.

6. The method of claim 1, wherein the first three dimensional signal origin location is a defined area.

7. The method of claim 6, further including the step of identifying a center of the defined area as the first three dimensional signal origin location.

8. The method of claim 1, further including the step of calibrating the interrogation signal sweep pattern to pass over only the zone, before performing the sweep pattern.

9. The method of claim 8, further including the step of calibrating the interrogation signal sweep pattern to exclude portions of the zone that are subject to RF interference.

10. The method of claim 1, wherein the discrimination logic is a multi-path ambiguity resolution logic.

11. The method of claim 1, further including applying a variable sweep rate during the steering of the signal beam through the sweep pattern; the sweep rate reduced upon detection of a response signal and increased after passage of a period without detecting another signal.

12. The method of claim 1, further including validation of the three dimensional signal origin location via timing of a delay between the interrogation signal initiation and a corresponding reception of a signal.

13. The method of claim 1, further including modulation of the interrogation signal strength to identify a cut-off signal strength below which the signal is not responsive to the interrogation signal, the cut-off signal strength proportional to a distance between the antenna and the first three dimensional signal origin location.

14. The method of claim 1, wherein the first three dimensional signal origin location is output to an edge server also being fed by a second electronic steering circuit steering a second interrogation signal through a corresponding sweep pattern of the zone and generating a second signal data record; the edge server triangulating between the first three dimensional signal origin location and the second three dimensional signal origin location to generate a corresponding higher order three dimensional signal origin location.

15. The method of claim 1, wherein the sweep pattern excludes selected areas within the zone.

\* \* \* \* \*